(12) United States Patent
Suzuki (10) Patent No.: US 8,260,369 B2
(45) Date of Patent: Sep. 4, 2012

(54) VEHICLE HANDS-FREE COMMUNICATION APPARATUS AND VEHICLE HANDS-FREE COMMUNICATION METHOD

(75) Inventor: Atsuyuki Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 359 days.

(21) Appl. No.: 12/576,280

(22) Filed: Oct. 9, 2009

(65) Prior Publication Data

US 2011/0086678 A1  Apr. 14, 2011

(51) Int. Cl.
   *H04M 1/00* (2006.01)
(52) U.S. Cl. ............. 455/569.2; 455/569.1; 379/420.01; 379/420.02
(58) Field of Classification Search .............. 455/569.1, 455/569.2; 379/433.02, 432, 420.01–420.04
   See application file for complete search history.

(56) References Cited

U.S. PATENT DOCUMENTS 6,687,517 B2 * 2/2004 Kinnunen ................... 455/569.1
7,123,878 B1 * 10/2006 Heinonen et al. ............ 455/41.2
7,200,420 B2 * 4/2007 Rankin ......................... 455/558

FOREIGN PATENT DOCUMENTS

JP  2002-125037  4/2002
WO  WO 2009033554 A1 * 3/2009

* cited by examiner

*Primary Examiner* — Raymond Dean
(74) *Attorney, Agent, or Firm* — Ditthavong Mori & Steiner, P.C.

(57) ABSTRACT

A vehicle hands-free communication apparatus includes an identifier receiver, a storage, a compatibility information receiver, a renewing device, a determination device, a connecting device, and an informing device. The identifier receiver receives a phone identifier from a mobile phone. The storage stores compatibility information. The compatibility information receiver receives renewed compatibility information. The renewing device replaces the compatibility information stored in the storage with the renewed compatibility information. The determination device determines whether the mobile phone is compatible with the hands-free communication apparatus by comparing the phone identifier and the stored compatibility information. The connecting device establishes a communication between the apparatus and the mobile phone when the determination device determines that the mobile phone is compatible with the apparatus. The informing device informs that the mobile phone is not compatible with the apparatus when the determination device determines that the mobile phone is not compatible with the apparatus.

9 Claims, 6 Drawing Sheets

| BDA | Compatibility (0=NG, 1=OK) | Manufacturer | Network | Model |
|---|---|---|---|---|
| 00:D0:B7:13:: | 1 | AAA Corp | QQQ Mobile | S100 |
| 00:D0:B7:24:: | 1 | AAA Corp | QQQ Mobile | S300 |
| 00:D0:B7:51:: | 1 | AAA Corp | QQQ Mobile | S301 |
| 00:D0:B7:5F:: | 1 | AAA Corp | QQQ Mobile | S303 |
| 00:D0:B7:81:: | 1 | AAA Corp | QQQ Mobile | S600 |
| 00:B0:11:00:: | 0 | BBB Inc. | QQQ Mobile | T04 |
| 00:B0:11:12:: | 0 | BBB Inc. | QQQ Mobile | T05 |
| 00:B0:11:4F:: | 0 | BBB Inc. | QQQ Mobile | T09 |
| 00:B0:11:55:: | 0 | BBB Inc. | RRR Network | AB09 |
| 00:B0:11:99:: | 0 | BBB Inc. | RRR Network | AB10 |

VEHICLE HANDS-FREE COMMUNICATION APPARATUS AND VEHICLE HANDS-FREE COMMUNICATION METHOD

BACKGROUND OF THE INVENTION

1. Field of the Invention

The present invention relates to a vehicle hands-free communication apparatus and a vehicle hands-free communication method.

2. Discussion of the Background

Japanese Laid-Open Patent Application No. 2002-125037 discloses a hands-free device including a device body, a cigar liter adapter, and a flexible cable which couples the cigar liter adapter to the device body. The cigar liter adapter obtains power from an in-vehicle cigar liter socket. The device body includes a short-range wireless communication unit, a short-range wireless communication antenna, a volume controller, amplifiers, a speaker, and a microphone, which are coupled to each other within the device body. The short-range wireless communication unit is a unit for wireless communication using, for example, Bluetooth, and is provided with a function for identifying a communication party and performing connection authentication so as to prevent erroneous connection. A power source unit receives power from the cigar lighter adapter via the cable and provides power to each unit of the device so as to activate the hands-free device in an operable state.

SUMMARY OF THE INVENTION

According to one aspect of the present invention, a vehicle hands-free communication apparatus includes and identifier receiver, a storage, a compatibility information receiver, a renewing device, a determination device, a connecting device, and an informing device. The identifier receiver is configured to receive a phone identifier from a mobile phone. The storage is configured to store compatibility information. The compatibility information receiver is configured to receive renewed compatibility information. The renewing device is configured to replace the compatibility information stored in the storage with the renewed compatibility information received by the compatibility information receiver. The determination device is configured to determine whether the mobile phone is compatible with the vehicle hands-free communication apparatus by comparing the phone identifier and the compatibility information stored in the storage. The connecting device is configured to establish a communication between the vehicle hands-free communication apparatus and the mobile phone when the determination device determines that the mobile phone is compatible with the vehicle hands-free communication apparatus. The informing device is configured to inform that the mobile phone is not compatible with the vehicle hands-free communication apparatus when the determination device determines that the mobile phone is not compatible with the vehicle hands-free communication apparatus.

According to another aspect of the present invention, a vehicle hands-free communication method includes storing compatibility information, receiving renewed compatibility information, replacing the stored compatibility information with the renewed compatibility information, receiving a phone identifier from a mobile phone, comparing the phone identifier and the stored compatibility information to determine whether the mobile phone is compatible with a vehicle hands-free communication apparatus, establishing a communication between the vehicle hands-free communication apparatus and the mobile phone when the mobile phone is compatible with the vehicle hands-free communication apparatus, and informing that the mobile phone is not compatible with the vehicle hands-free communication apparatus when the mobile phone is not compatible with the vehicle hands-free communication apparatus.

According to further aspect of the present invention, a vehicle hands-free communication apparatus includes identifier receiver means, storage means, compatibility information receiver means, renewing means, determination means, connecting means, and informing means. The identifier receiver means receives a phone identifier from a mobile phone. The storage means stores compatibility information. The compatibility information receiver means receives renewed compatibility information. The renewing means replaces the compatibility information stored in the storage means with the renewed compatibility information received by the compatibility information receiver means. The determination means determines whether the mobile phone is compatible with the vehicle hands-free communication apparatus by comparing the phone identifier and the compatibility information stored in the storage means. The connecting means establishes a communication between the vehicle hands-free communication apparatus and the mobile phone when the determination means determines that the mobile phone is compatible with the vehicle hands-free communication apparatus. The informing means informs that the mobile phone is not compatible with the vehicle hands-free communication apparatus when the determination means determines that the mobile phone is not compatible with the vehicle hands-free communication apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

While the embodiments will be described in conjunction with an in-vehicle device, it will be understood that the present invention is not limited to such a specific application. For example, the present invention can also be applicable to a portable data terminal such as a personal digital assistance (PDA) and a hand-held computer.

Figure 1:
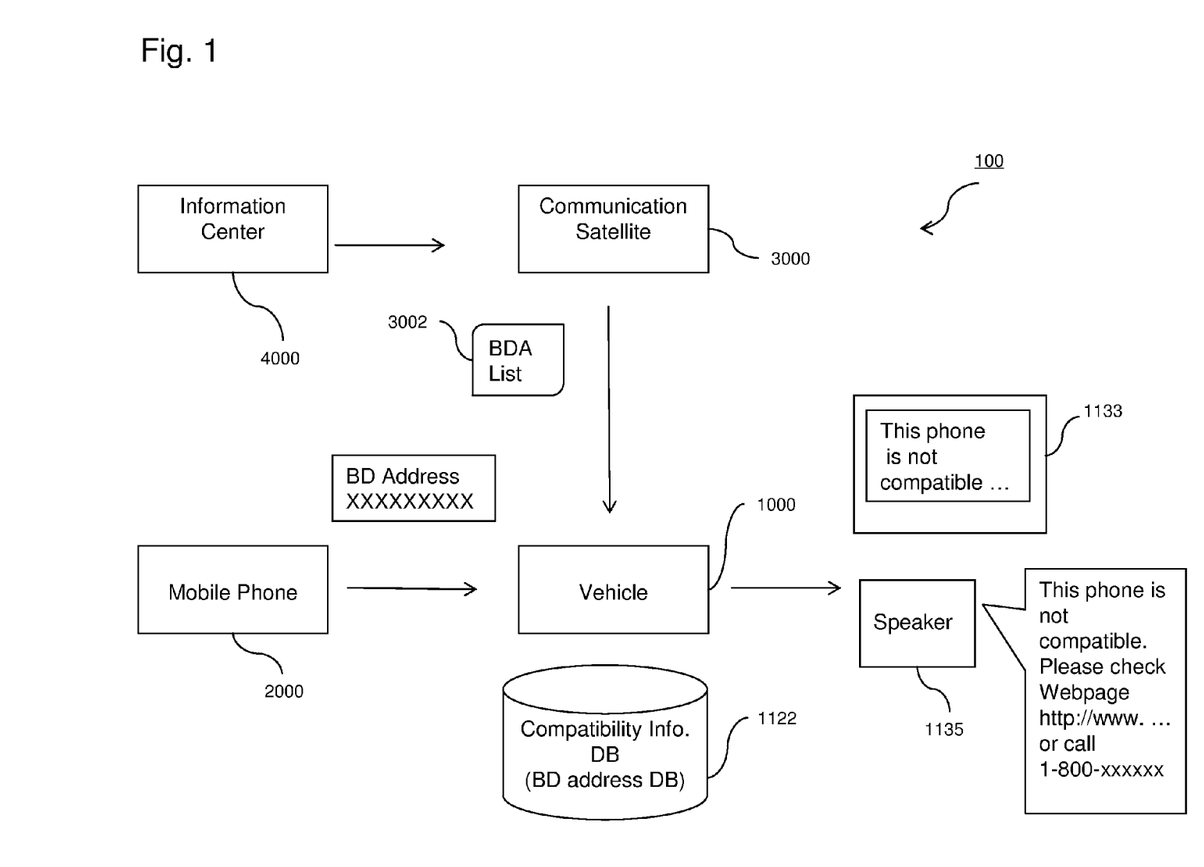
FIG. 1 is a schematic view showing an entire system according to an embodiment of the present invention.

FIG. 1 is a schematic view showing an entire system 100 according to an embodiment of the present invention. Referring to FIG. 1, the system 100 includes a vehicle 1000, a Bluetooth compatible mobile phone 2000, a communication satellite 3000 and an information center 4000. The vehicle 1000 includes, for example, a Bluetooth device address database (BD address DB) 1122 which stores one or more Bluetooth device addresses. The BD address DB 1122 may be called, for example, a mobile phone compatibility information database.

The Bluetooth compatible mobile phone 2000 includes a unique Bluetooth device address (hereafter "BDA"). A BDA is a 12-digit string consisting of a combination of numbers (0-9) and alphabets (A-F). An example of the Bluetooth compatible mobile phone 2000 may include a personal digital assistant (PDA) and the like. Each Bluetooth compatible mobile phone 2000 includes its unique BDA, which is managed by the IEEE. The information center 4000 includes, for example, a BDA list. The BDA list is transmitted from the information center 4000 to, for example, the vehicle 1000 via the communication satellite 3000. Namely, the communication satellite relays the BDA list from the information center 4000 to the vehicle 1000. The BDA list will be explained hereinafter referring to FIG. 3.

Figure 2:
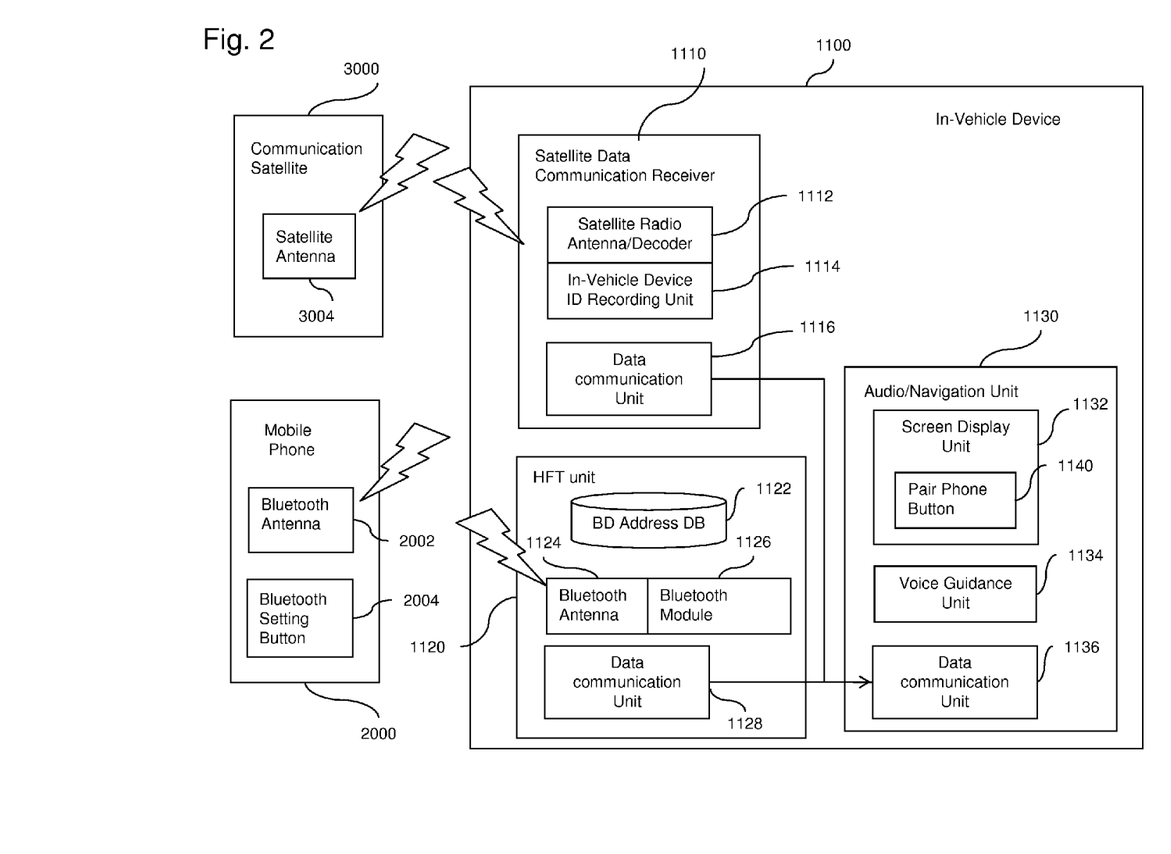
FIG. 2 is a block diagram of the system according to the embodiment of the present invention.

FIG. 2 shows a block diagram of the system 100 according to the embodiment of the present invention. The vehicle 1000 includes an in-vehicle device 1100. The in-vehicle device 1100 stores its unique vehicle identification number (VIN) (e.g., 23456). The in-vehicle device 1100 includes, for example, a satellite data communication receiver 1110, a hands-free telephone (hereafter "HFT") unit 1120, and an audio/navigation unit 1130. The Bluetooth compatible mobile phone 2000 includes, for example, a Bluetooth antenna 2002 and a Bluetooth setting button 2004. The communication satellite 3000 includes a satellite antenna 3004.

The satellite data communication receiver 1110 of the in-vehicle device 1100 includes, for example, a satellite radio antenna/decoder 1112, an in-vehicle device ID recording unit 1114, and a data communication unit 1116.

The HFT unit 1120 includes, for example, the BD address DB 1122, a Bluetooth antenna 1124, a Bluetooth module 1126, and a data communication unit 1128. The BD address DB 1122 will be explained hereafter referring to FIG. 4.

The audio/navigation unit 1130 includes, for example, a screen display unit 1132, a voice guidance unit 1134, and a data communication unit 1136. The display unit 1132 may include a display 1133 as shown in FIG. 1. The voice guidance unit 1134 may include a speaker as shown in FIG. 1.

The satellite data communication receiver 1110, the HFT unit 1120 and the audio/navigation unit 1130 can communicate with each other via the data communication unit 1116, the data communication unit 1128 and the data communication unit 1136, respectively.

The communication satellite 3000 transmits the BDA list 3002 (see FIG. 1) to the in-vehicle device 1100 via the satellite antenna 3004. The in-vehicle device 1110 receives the BDA list 3002 via the satellite radio antenna/decoder 1112. For example, the information center 4000 transmits a newest BDA list to the in-vehicle device 1100 via the communication satellite 3000, for example, on a regular basis. Thus, the BDA list 3002 is updated. The BDA list 3002 is transmitted from the communication satellite 3000 to the in-vehicle device 1100, for example, via XM satellite radio.

The BDA list 3002 received by the in-vehicle device 1100 is recorded in, for example, the BD address DB 1122 of the HFT unit 1120. The in-vehicle device ID recording unit 1114 records, for example, a vehicle identification number (VIN) which is relevant to the vehicle 1000. The data communication unit 1116 of the satellite data communication receiver 1110 provides, for example, the received BDA list 3002 to the data communication unit 1128 of the HFT unit 1120.

The Bluetooth compatible mobile phone 2000 transmits its BDA to, for example, the HFT unit 1120 via the Bluetooth antenna 2002.

The HFT unit 1120 receives the BDA transmitted from the Bluetooth compatible mobile phone 2000 via the Bluetooth antenna 1124. The Bluetooth module 1126 includes, for example, a processor (CPU), a memory and the like. The Bluetooth module 1126 of the HFT unit 1120 is configured to obtain information from the BD address DB 1122. The Bluetooth module 1126 is configured to compare the BDA received via the Bluetooth antenna 1124 with one or more BDAs obtained from the BD address DB 1122. The HFT unit 1120 is configured to provide the comparison result to, for example, the audio/navigation unit 1130 via the data communication unit 1128.

The audio/navigation unit 1130 receives, for example, the comparison result from the HFT unit 1120. The screen display unit 1132 displays, for example, a message corresponding to the comparison result. The voice guidance unit 1134 outputs, for example, audio guidance corresponding to the comparison result.

The above description is given of a case where Bluetooth communication is used between the Bluetooth compatible mobile phone 2000 and the HFT unit 1120. However, for example, a Zigbee compatible mobile phone may be used instead of the Bluetooth compatible mobile phone 2000. Also, the HFT unit 1120 may include, for example, a Zigbee antenna and a Zigbee module coupled to the Zigbee antenna. In this case, Zigbee communication is performed between the Zigbee compatible mobile phone and the HFT unit 1120.

Figure 3:
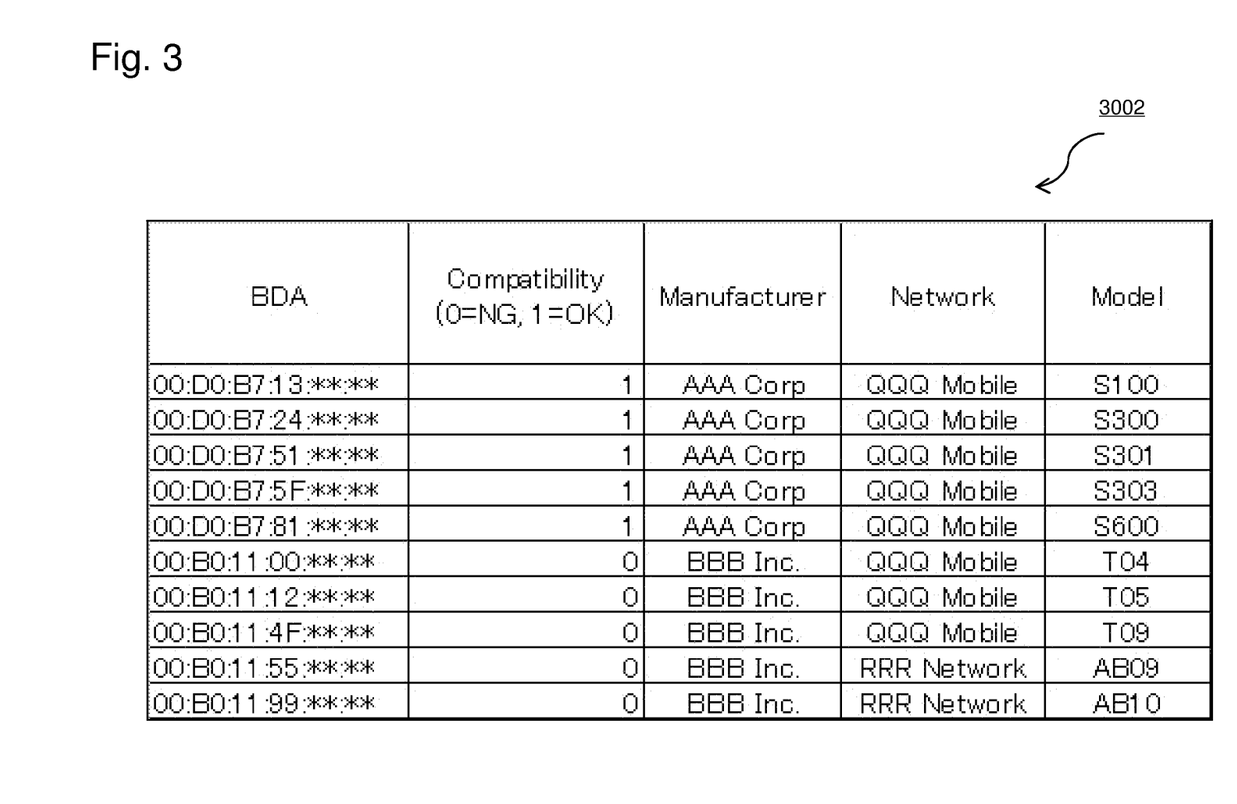
FIG. 3 shows an example of a Bluetooth device address (BDA) list according to the embodiment of the present invention.

FIG. 3 shows an example of the BDA list 3002 according to the embodiment of the present invention. The BDA list 3002 includes information of, for example, a BDA of a mobile phone, a compatibility flag of the mobile phone, a manufacturer of the mobile phone, a network used by the mobile phone, and a model of the mobile phone.

The compatibility flag indicates, for example, whether the mobile phone is compatible with the HFT unit 1120 of the in-vehicle device 1100 or not. For example, the compatibility flag indicates whether a Bluetooth profile of the mobile phone is different from a Bluetooth profile of the HFT unit 1120. When the mobile phone is compatible with the HFT unit 1120, the compatibility flag may be "1". In other words, when the mobile phone and the HFT unit 1120 support the same Bluetooth profile such as HSP (Headset Profile) and HFP (Hands-free Profile), the compatibility flag may be "1". In order to establish a Bluetooth communication between two different Bluetooth compatible devices, the Bluetooth profile of these devices must have the same Bluetooth profile. On the other hand, when the mobile phone is incompatible with the HFT unit 1120, the compatibility flag may be "0". In other words, when the mobile phone and the HFT unit 1120 support different Bluetooth profiles, the compatibility flag may be "0". Additionally, even if the mobile phone and the HFT unit 1120 support the same profile, when the compatibility between the mobile phone and the HFT unit 1120 is not sufficient (due to, for example, shift in timings during establishment of communication), in some cases, the mobile phone may be incompatible with the HFT unit 1120. In these cases, a Bluetooth communication is not established between the mobile phone and the HFT unit 1120.

The BDA list 3002 shown in FIG. 3 includes the BDAs of both mobile phones which are compatible with the HFT unit 1120 and mobile phones which are incompatible with the HFT unit 1120. However, the BDA list 3002 may include, for example, only information including the BDAs of mobile phones which are compatible with the HFT unit 1120. Further, the BDA list 3002 may include, for example, only information including the BDAs of mobile phones which are incompatible with the HFT unit 1120. The BDA list 3002 may be prepared for each model of vehicles. In addition, the BDA list 3002 may be updated, for example, at any time by, for example, the information center 4000.

Figure 4:
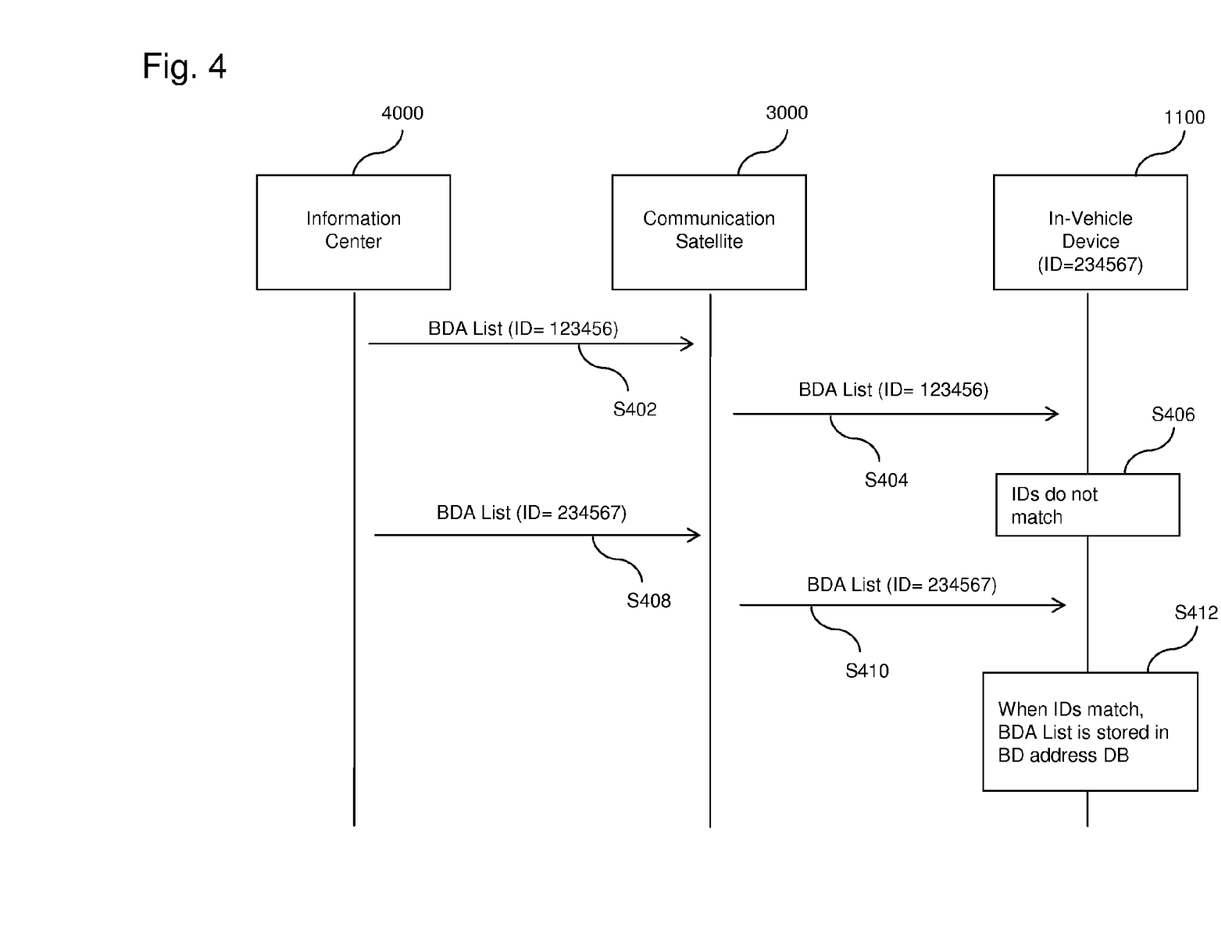
FIG. 4 shows a flow chart for receiving the BDA list according to the embodiment of the present invention.

FIG. 4 shows a flow chart for receiving the BDA list according to the embodiment of the present invention. Referring to FIG. 4, at step S402, the BDA list having a vehicle identification number (VIN) (e.g., 123456) is transmitted from the information center 4000 to the communication satellite 3000. The communication satellite 3000 receives the transmitted BDA list via a wired netwok. The information center 4000 is located in, for example, a manufacturer of the vehicle 1000. Alternatively, the information center 4000 may be located outside the manufacturer of the vehicle 1000 and may be provided information of the BDA list from the manufacturer.

At step S404, the BDA list having the VIN (e.g., 123456) is transmitted from the communication satellite 3000 to the in-vehicle device 1100. For example, the BDA list is relayed as is by the communication satellite 3000 to the in-vehicle device 1100. At step S406, the satellite data communication receiver 1110 compares the VIN (e.g., 123456) of the transmitted BDA list with the VIN (e.g., 234567) stored in the in-vehicle device ID recording unit 1114. In this case, since the VIN of the BDA list transmitted from the communication satellite 3000 does not match the VIN of the BDA list stored in the in-vehicle device ID recording unit 1114, the transmitted BDA list is not stored in the BD address DB 1122.

At step 408, another BDA list having the VIN (e.g., 234567) is transmitted from the information center 4000 to the communication satellite 3000. At step S410, the BDA list having the VIN (e.g., 234567) is transmitted from the communication satellite 3000 to the in-vehicle device 1100. At step S412, the satellite data communication receiver 1110 compares the VIN (e.g., 234567) of the transmitted BDA list with the VIN (e.g., 234567) of the BDA list stored in the in-vehicle device ID recording unit 1114. In this case, since the VIN of the BDA list transmitted from the communication satellite 3000 matches the VIN of the BDA list stored in the in-vehicle device ID recording unit 1114, the transmitted BDA list is stored in the BD address DB 1122.

As described above, when the VIN of the BDA list transmitted from the information center 4000 matches the VIN stored in the in-vehicle device ID recording unit 1112 of the vehicle 1000 (i.e., the VIN of the vehicle 1000), the transmitted BDA list is stored in the BD address DB 1122.

Figure 5:
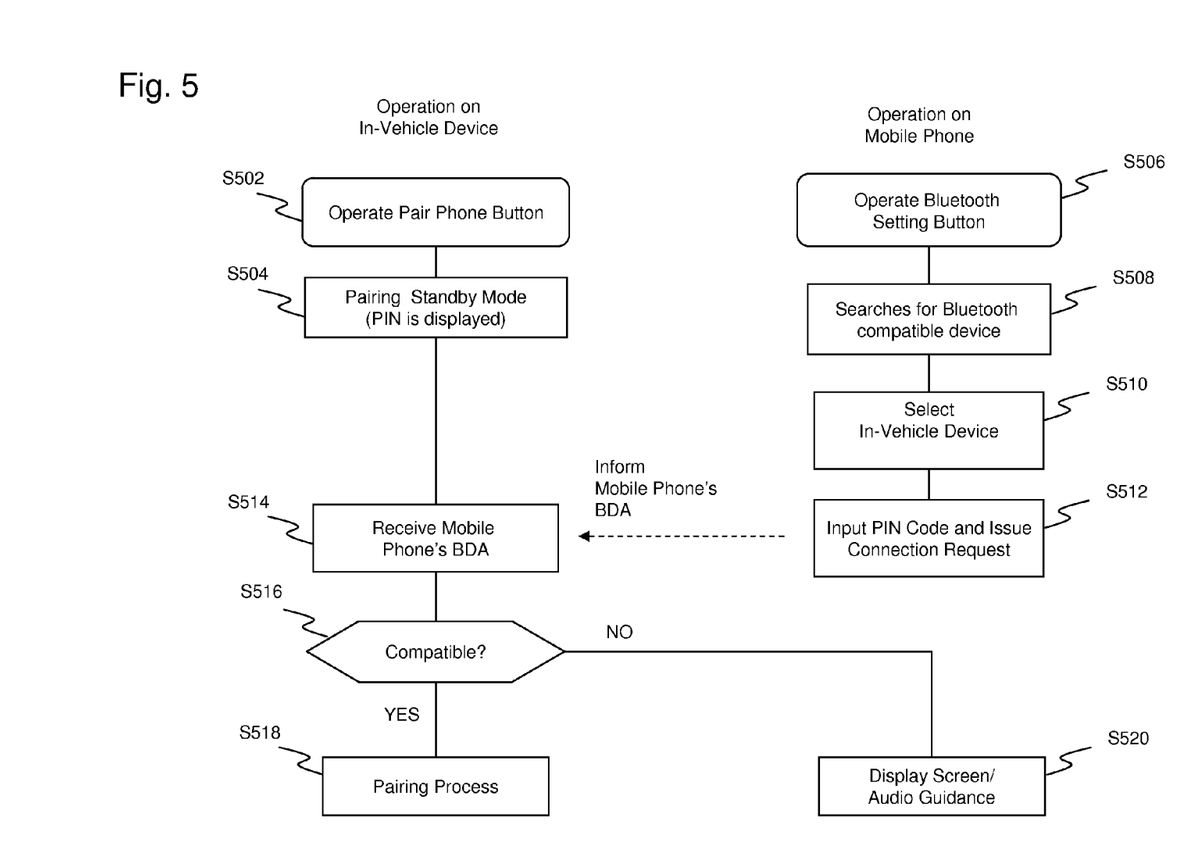
FIG. 5 shows a flow chart for determining compatibility between a mobile phone and a HFT device according to the embodiment of the present invention.

FIG. 5 shows a flow chart for determining compatibility between the mobile phone 2000 and the HFT unit 1120 according to the embodiment of the present invention. The left portion of the flow chart shows operations of the in-vehicle device 1100. The right portion of the flow chart shows operations of the mobile phone 2000.

At step 502, a pair phone button 1140 (see FIG. 6) of the in-vehicle device 1100 is operated (e.g., pressed down) by, for example, a driver of the vehicle 1000. At step 504, the in-vehicle device 1100 is operated in a pairing standby mode. In the pairing standby mode, the in-vehicle device 1100 may, for example, show a PIN (personal identification number) code on the screen display unit 1132 of the audio/navigation unit 1130. The PIN code of the in-vehicle device 1100 is, for example, a four-digit number.

At step 506, the Bluetooth setting button 2004 (see FIG. 2) of the Bluetooth compatible mobile phone 2000 is operated (e.g., pressed down) by, for example, the driver of the vehicle 1000. When the Bluetooth setting button 2004 is operated, the Bluetooth compatible mobile phone 2000 searches for a Bluetooth compatible device (in-vehicle device) around the Bluetooth compatible mobile phone 2000 at step S508. When the Bluetooth compatible device is detected, an in-vehicle device name of the Bluetooth compatible device is displayed on a display of the mobile phone 2000. At step S510, the in-vehicle device name displayed on the display is selected (input to the Bluetooth compatible mobile phone 2000) by, for example, the driver of the vehicle 1000. At step S512, a PIN code of the Bluetooth compatible mobile phone 2000 is input to the Bluetooth compatible mobile phone 2000 by, for example, the driver. The PIN code of the Bluetooth compatible mobile phone 2000 is, for example, a four-digit number. In response to the input of the PIN code, a connection request is issued from the Bluetooth compatible mobile phone 2000 to the in-vehicle device 1100. Namely, the in-vehicle device 1100 is notified of the BDA of the Bluetooth compatible mobile phone 2000.

At step S514, the in-vehicle device 1100 receives, for example, the BDA of the Bluetooth compatible mobile phone 2000. At step S516, it is determined whether the compatibility flag of the received BDA is "1" (YES) in the BDA list stored in the in-vehicle device 1100 or not. When it is determined that the compatibility flag is "1", a pairing process is performed at step S518. Namely, at step S518, a Bluetooth connection is established between the Bluetooth compatible mobile phone 2000 and the in-vehicle device 1100. On the other hand, when it is determined that the compatibility flag is "0" (NO), the audio/navigation unit 1130 of the vehicle 1000 informs the driver of compatibility information at step S520.

When the BDA list stored in the in-vehicle device 1100 includes information of one or more mobile phones which are compatible with the Bluetooth compatible mobile phone 2000, it is determined whether the BDA received from the Bluetooth compatible mobile phone 2000 is included in the BDA list or not at step S516. When it is determined that the received BDA is included in the BDA list, step S518 is performed. On the other hand, when it is determined that the received BDA is not included in the BDA list, step S520 is performed.

Additionally, when the BDA list stored in the in-vehicle device 1100 includes information of one or more mobile phones which are incompatible with the Bluetooth compatible mobile phone 2000, it is determined whether the BDA received from the Bluetooth compatible mobile phone 2000 is included in the BDA list or not at S516. When it is determined that the received BDA is included in the BDA list, step S520 is performed. On the other hand, when it is determined that the received BDA is not included in the BDA list, step S518 is performed.

At step S520, the audio/navigation unit 1130 of the vehicle 1000 informs the driver of the compatibility information by, for example, displaying a message on the screen display unit 1132. Further, at step S520, the audio/navigation unit 1130 informs the driver of the compatibility information by, for example, outputting an audible message from the voice guidance unit 1134. In Both cases, the message informs the driver of, for example, incompatibility between the Bluetooth compatible mobile phone 2000 and the in-vehicle device 1100. Additionally, the message may include, for example, a web page, a telephone number of a call center and the like (see FIG. 1). The screen display unit 1132 and the voice guidance unit 1134 may be used independently or in combination.

Figure 6:
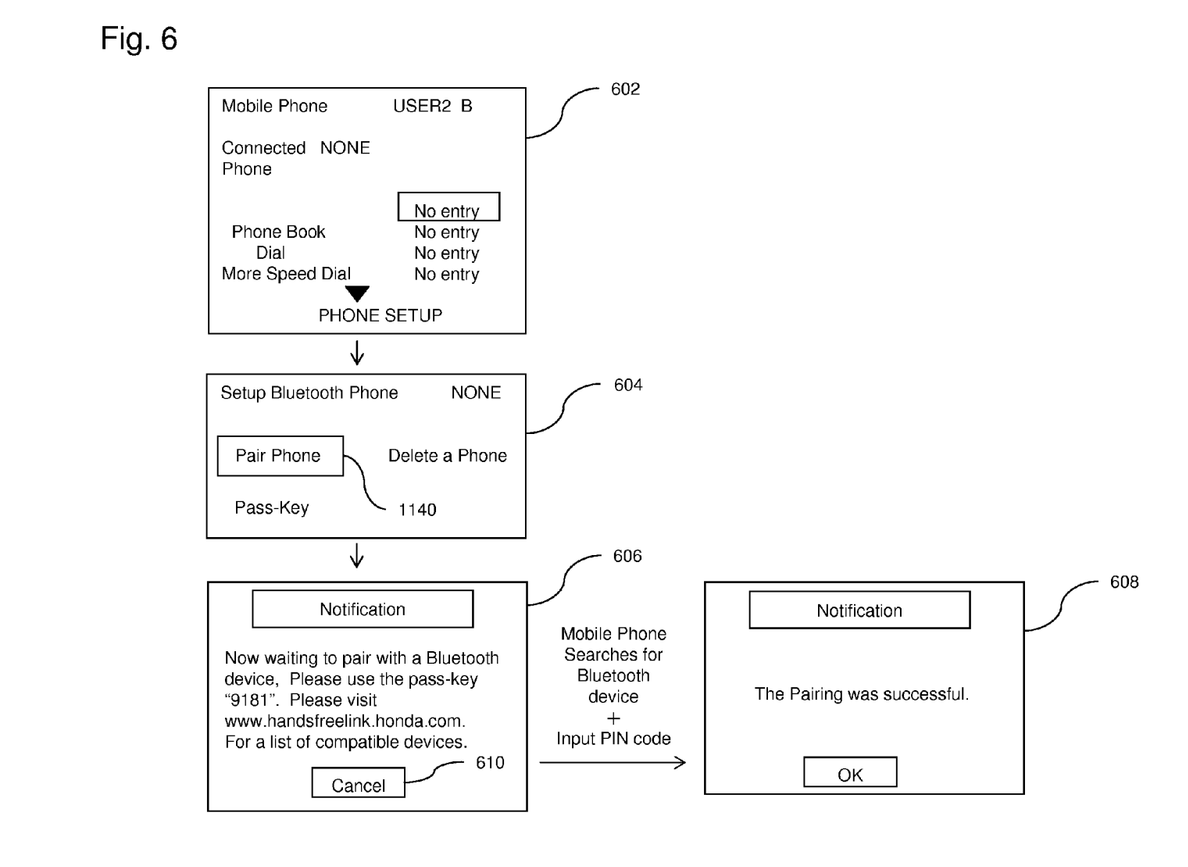
FIG. 6 shows examples of operation screens according to the embodiment of the present invention.

FIG. 6 shows examples of operation screens according to the embodiment of the present invention. The operation screens are displayed on, for example, the screen display unit 1132 (or the display 1133) of the audio/navigation unit 1130. An operation screen 602 is, for example, a default operation screen displayed on the screen display unit 1132. For example, the operation screen 602 is displayed on the screen display unit 1132 before step S502 (see FIG. 5).

An operation screen 604 is displayed on the screen display unit 1132 when, for example, a phone setup function is selected by the driver from the operation screen 602. In other words, the operation screen 604 is displayed on the screen display unit 1132 when, for example, the in-vehicle device 1100 receives an input corresponding to the phone setup function. For example, the operation screen 604 is displayed on the screen display unit 1132 at step S502 (see FIG. 5).

An operation screen 606 is displayed on the screen display unit 1132 when, for example, the pair phone button 1140 is selected by the driver from the operation screen 604. In other words, the operation screen 606 is displayed on the screen display unit 1132 when, for example, the in-vehicle device 1100 receives an input corresponding to the pair phone function. For example, the operation screen 606 is displayed on the screen display unit 1132 at step S504 (see FIG. 5). The operation screen 606 displays a message indicating, for example, the pairing process is in process. The message includes, for example, a pass-key (e.g., a PIN code), a web site, a telephone number of a call center and the like. Further, the operation screen 606 may be provided with, for example, a cancel button 610 for cancelling the pairing process. The operation screen 606 continues to be displayed until a Bluetooth connection is established between the Bluetooth compatible mobile phone 2000 and the in-vehicle device 1100, or until the cancel button 610 is selected when the operation screen 606 includes the cancel button 610.

An operation screen 608 is displayed on the screen display unit 1132 when, for example, the Bluetooth compatible mobile phone 2000 searches for and finds a Bluetooth compatible device (in this case, the in-vehicle device 1100), and the pass-key (e.g., PIN code) is input to the Bluetooth compatible mobile phone 2000. Namely, the operation screen 608 is displayed on the screen display unit 1132 when the pairing process is successful, i.e., a Bluetooth connection is established between the Bluetooth compatible mobile phone 2000 and the in-vehicle device 1100. For example, the operation screen 608 is displayed on the screen display unit 1132 at step S518 (see FIG. 5).

According to the embodiment of the present invention, the in-vehicle device, for example, a hands-free communication apparatus includes an identifier receiver configured to receive a phone identifier from a mobile phone. Additionally, the hands-free communication apparatus includes a storage configured to store compatibility information. Further, the hands-free communication apparatus includes a compatibility information receiver configured to receive renewed compatibility information. In addition, the hands-free communication apparatus includes a renewing device configured to replace the compatibility information stored in the storage with the renewed compatibility information received by the compatibility information receiver. Additionally, the hands-free communication apparatus includes a determination device configured to determine whether the mobile phone is compatible with the vehicle hands-free communication apparatus by comparing the phone identifier and the compatibility information stored in the storage. Also, the hands-free communication apparatus includes a connecting device configured to establish a communication between the vehicle hands-free communication apparatus and the mobile phone when the determination device determines that the mobile phone is compatible with the vehicle hands-free communication apparatus. Furthermore, the hands-free communication apparatus includes an informing device configured to inform that the mobile phone is not compatible with the vehicle hands-free communication apparatus when the determination device determines that the mobile phone is not compatible with the vehicle hands-free communication apparatus. The communication (for example, a Bluetooth communication, a Zigbee communication or the like) is established between the hands-free communication apparatus and the mobile phone when the phone identifier matches the stored compatibility information. The informing device outputs a message when the phone identifier does not match the stored compatibility information. The informing device includes, for example, a screen display unit configured to display the message. Additionally, the informing device includes, for example, an audio guidance unit configured to output an audible message. Accordingly, the user, for example, the driver of the vehicle 1000, can easily find whether a hands-free communication can be established between his/her mobile phone and the hands-free communication apparatus such as the in-vehicle device 1100.

According to the embodiment of the present invention, the determination device compares the phone identifier with the stored compatibility information in the storage unit. Accordingly, the hands-free apparatus can establish a communication with an appropriate mobile phone.

According to the embodiment of the present invention, the stored compatibility information includes, for example, one or more BDAs, and the phone identifier includes, for example, a BDA which is unique for the mobile phone. Accordingly, the hands-free apparatus can establish a Bluetooth communication with an appropriate mobile phone such as a Bluetooth compatible mobile phone.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A vehicle hands-free communication apparatus comprising:
   an identifier receiver configured to receive a phone identifier from a mobile phone;
   a storage configured to store compatibility information;
   a compatibility information receiver configured to receive renewed compatibility information;
   a renewing device configured to replace the compatibility information stored in the storage with the renewed compatibility information received by the compatibility information receiver;
   a determination device configured to determine whether the mobile phone is compatible with the vehicle hands-free communication apparatus by comparing the phone identifier and the compatibility information stored in the storage;
   a connecting device configured to establish a communication between the vehicle hands-free communication apparatus and the mobile phone when the determination device determines that the mobile phone is compatible with the vehicle hands-free communication apparatus; and
   an informing device configured to inform that the mobile phone is not compatible with the vehicle hands-free communication apparatus when the determination device determines that the mobile phone is not compatible with the vehicle hands-free communication apparatus, wherein said vehicle hands-free communication apparatus is configured to be provided within a vehicle.

2. The vehicle hands-free communication apparatus according to claim 1, wherein the informing device includes a screen display unit configured to display that the mobile phone is not compatible with the vehicle hands-free communication apparatus.

3. The vehicle hands-free communication apparatus according to claim 1, wherein the informing device includes an audio guidance unit configured to audibly inform that the mobile phone is not compatible with the vehicle hands-free communication apparatus.

4. The vehicle hands-free communication apparatus according to claim 1, wherein the compatibility information receiver comprising:
   a vehicle model identifier storage configured to store vehicle model identifier for identifying a vehicle model; and
   a controller configured to control the compatibility information receiver to receive the renewed compatibility information when a vehicle model identifier of the renewed compatibility information matches the vehicle model identifier stored in the vehicle model identifier storage.

5. The vehicle hands-free communication apparatus according to claim 1, wherein the phone identifier comprises an individual identifier which is assigned to each mobile phone model.

6. The vehicle hands-free communication apparatus according to claim 1, wherein the communication is established by using Bluetooth.

7. The vehicle hands-free communication apparatus according to claim 1, wherein the compatibility information includes one or more Bluetooth device addresses, and the phone identifier includes a Bluetooth device address which is unique for each mobile phone model.

8. A vehicle hands-free communication method comprising:
   storing compatibility information in a vehicle;
   receiving renewed compatibility information;
   replacing the stored compatibility information with the renewed compatibility information;
   receiving, in the vehicle, a phone identifier from a mobile phone;
   comparing, in the vehicle, the phone identifier and the stored compatibility information to determine whether the mobile phone is compatible with a vehicle hands-free communication apparatus provided within the vehicle;
   establishing a communication between the vehicle hands-free communication apparatus and the mobile phone when the mobile phone is compatible with the vehicle hands-free communication apparatus; and
   informing that the mobile phone is not compatible with the vehicle hands-free communication apparatus when the mobile phone is not compatible with the vehicle hands-free communication apparatus.

9. A vehicle hands-free communication apparatus comprising:
   identifier receiver means for receiving a phone identifier from a mobile phone;
   storage means for storing compatibility information;
   compatibility information receiver means for receiving renewed compatibility information;
   renewing means for replacing the compatibility information stored in the storage means with the renewed compatibility information received by the compatibility information receiver means;
   determination means for determining whether the mobile phone is compatible with the vehicle hands-free communication apparatus by comparing the phone identifier and the compatibility information stored in the storage means;
   connecting means for establishing a communication between the vehicle hands-free communication apparatus and the mobile phone when the determination means determines that the mobile phone is compatible with the vehicle hands-free communication apparatus; and
   informing means for informing that the mobile phone is not compatible with the vehicle hands-free communication apparatus when the determination means determines that the mobile phone is not compatible with the vehicle hands-free communication apparatus, wherein said vehicle hands-free communication apparatus is configured to be provided within a vehicle.

* * * * *